United States Patent
Kawashima et al.

(10) Patent No.: US 7,961,791 B2
(45) Date of Patent: Jun. 14, 2011

(54) APPARATUS AND METHOD FOR CONTROL OF BLOCKING NOISE SUPPRESSOR

(75) Inventors: Yuji Kawashima, Tokyo (JP); Yoshihiro Kikuchi, Tokyo (JP); Tatsuro Fujisawa, Tokyo (JP); Noriaki Kitada, Saitama-ken (JP); Kosuke Uchida, Tokyo (JP); Satoshi Hoshina, Tokyo (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 1485 days.

(21) Appl. No.: 11/385,854

(22) Filed: Mar. 21, 2006

(65) Prior Publication Data
US 2007/0177669 A1 Aug. 2, 2007

(30) Foreign Application Priority Data
Jan. 31, 2006 (JP) ................................. 2006-023813

(51) Int. Cl.
*H04N 7/12* (2006.01)
(52) U.S. Cl. ......... 375/240.25; 375/240.23; 375/240.04; 375/240.16; 375/240.13
(58) Field of Classification Search ............ 375/240.25, 375/240.13, 240.24, 240.27
See application file for complete search history.

(56) References Cited

U.S. PATENT DOCUMENTS
5,838,772 A * 11/1998 Wilson et al. ............. 379/88.19
2006/0067406 A1 * 3/2006 Kitada et al. ............. 375/240.16

FOREIGN PATENT DOCUMENTS
JP 2005-086830 A 3/2005

* cited by examiner

*Primary Examiner* — Shuwang Liu
*Assistant Examiner* — Dhaval Patel
(74) *Attorney, Agent, or Firm* — Holtz, Holtz, Goodman & Chick, PC

(57) ABSTRACT

A decoding apparatus includes a decoder configured to receive a series of encoded pictures and to decode each of the encoded pictures to produce a series of decoded pictures, each of the encoded pictures being either intra-encoded or inter-encoded, and each of the decoded pictures being either referred or, non-referred, a blocking noise suppressor configured to suppress blocking noise of each of the decoded pictures, and a controller configured to detect an amount of a load, to run each of the referred decoded pictures through the blocking noise suppressor if the detected amount of the load is no lower than a given threshold, and to have each of the non-referred decoded pictures bypass the blocking noise suppressor if the detected amount of the load is no lower than the threshold.

13 Claims, 3 Drawing Sheets

APPARATUS AND METHOD FOR CONTROL OF BLOCKING NOISE SUPPRESSOR

CROSS REFERENCE TO RELATED APPLICATIONS

This application is based upon and claims the benefit of priority from the prior Japanese Patent Application No. 2006-023813 filed on Jan. 31, 2006; the entire contents of which are incorporated herein by reference.

FIELD OF THE INVENTION

The present invention relates to an apparatus configured to decode an encoded picture and a method for controlling a blocking noise suppressor of the apparatus.

DESCRIPTION OF THE BACKGROUND

A moving picture like a video movie may usually be divided into a plurality of still pictures, each of which is encoded for being digitized in order to be stored in a memory and in order to be transferred. A term "still picture" as mentioned above is hereinafter shortened as "picture". A picture may be divided into a plurality of blocks each of which is formed by a given number of pixels, i.e. sixteen by sixteen, eight by eight, four by four, etc. A block of sixteen by sixteen pixels is called a macroblock. The picture is encoded through a discrete cosine transform, a quantization process and a Huffmann encoding process on a block by block basis.

A method of encoding a picture using information within that picture only is called intra-encoding. Another method of encoding using a plurality of differentials between a picture to be encoded and a relatively past picture is called inter-encoding. An intra-encoded picture is called an I-picture. An inter-encoded picture is called a P-picture.

A picture encoded on a block by block (often macroblock by macroblock) basis may cause a problem of blocking noise, i.e. an occurrence of image discontinuity on a border between two adjacent blocks after being decoded. A standard named H.264/AVC has thereby adopted a technique of a blocking noise suppressor called a deblocking filter for smoothing and suppressing the blocking noise.

According to the above standard, a plurality of adjacent macroblocks of a picture are combined one another to form a slice while the picture is being encoded by an encoder. The encoder gives the encoded picture an indication if the encoder runs the encoded picture through an encoder's deblocking filter on a slice by slice basis.

A decoder decodes the encoded picture to produce a decoded picture, and runs the decoded picture through a decoder's deblocking filter if the encoder has run the encoded picture through the encoder's deblocking filter. The decoder has the decoded picture bypass the decoder's deblocking filter if the encoder has had the encoded picture bypass the encoder's deblocking filter.

In general, a deblocking filter needs lots of operations of an encoder's processor and of a decoder's processor. A heavily loaded decoder may cause a processing delay and may not decode all pictures to be decoded. Consequently there may be a lack of a frame, a lack of smoothness, etc. in a decoded moving picture.

A decoder is disclosed in Japanese Patent Publication (Kokai), No. 2005-86830, which runs an encoded picture not through an encoder-chosen deblocking filter but through a deblocking filter of a reduced processing load, in a case where the encoder-chosen deblocking filter has a disadvantage from a viewpoint of the processing load.

In a case where the encoded picture is only given an indication if the encoder has run the encoded picture through the encoder's deblocking filter, however, it may be unclear for the decoder how to reduce the processing load of the deblocking filter. In a case where the decoder determines that all the encoded pictures may not be decoded from a viewpoint of the processing load, it may be unclear how to determine which one of the encoded pictures may bypass the deblocking filter.

SUMMARY OF THE INVENTION

Accordingly, an advantage of the present invention is that a decoder may select which one of a plurality of encoded pictures to be decoded may bypass a decoder's deblocking filter according to an amount of a load of the decoder.

To achieve the above advantage, one aspect of the present invention is to provide A decoding apparatus, comprising a decoder configured to receive a series of encoded pictures and to decode each of the encoded pictures to produce a series of decoded pictures, each of the encoded pictures being one of an intra-encoded picture and an inter-encoded picture, and each of the decoded pictures being one of a referred picture and a non-referred picture, a blocking noise suppressor configured to suppress blocking noise of each of the decoded pictures, and a controller configured to detect an amount of a load, to run each of the decoded pictures through the blocking noise suppressor in a case where the detected amount of the load is lower than a given threshold, to have each of the decoded pictures being non-referred bypass the blocking noise suppressor in a case where the detected amount of the load is no lower than the threshold, and to transmit one of each of the decoded pictures having been run through the blocking noise suppressor and each of the decoded pictures having bypassed the blocking noise suppressor.

DETAILED DESCRIPTION OF THE INVENTION

Figure 1:
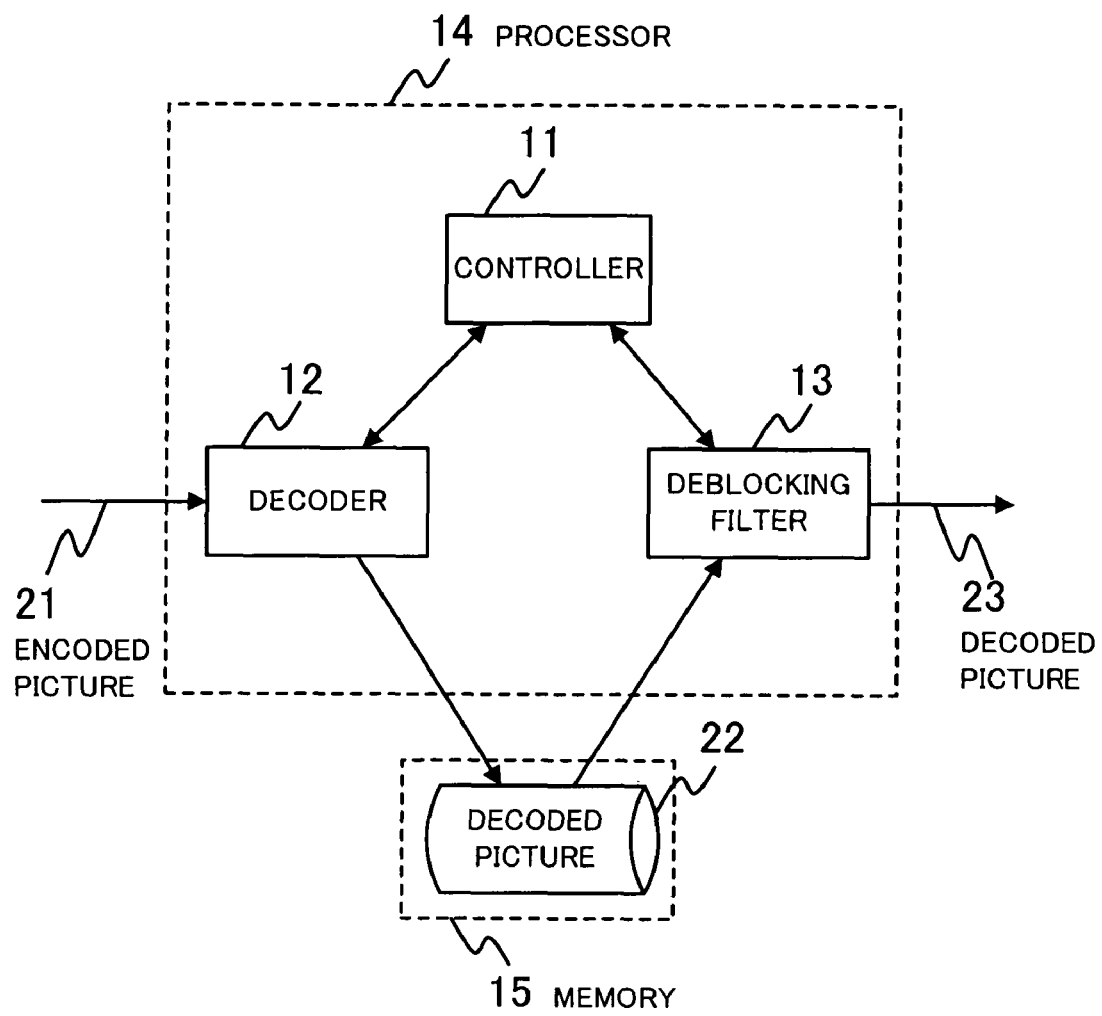
FIG. 1 is a block diagram of a decoding apparatus of a first embodiment of the present invention.

A first embodiment of the present invention will be described with reference to FIG. 1 and FIG. 2. FIG. 1 is a block diagram of a decoding apparatus of the first embodiment of the present invention. The decoding apparatus has a processor 14 and a memory 15. The processor 14 includes a controller 11 configured to entirely monitor and control the decoding apparatus, a decoder 12 and a deblocking filter 13. The controller 11, the decoder 12 and the deblocking filter 13 may be implemented by software that runs on the processor 14, respectively.

The decoder 12 receives and decodes an encoded picture 21 under control of the controller 11, producing a decoded picture 22 to be stored in the memory 15. The controller 11 reads the decoded picture 22 out of the memory 15, and after reading out erases the decoded picture 22 on the memory 15. The controller 11 either runs the decoded picture 22 through the deblocking filter 13 or has the decoded picture 22 bypass the deblocking filter 13, producing a decoded picture 23 to be transmitted.

The processor 14 may include an operating system (not shown), a display interface for presenting pictures (not shown) and an audio interface (not shown). An operation of each portion of the decoding apparatus of the first embodiment of the present invention will be described with reference to FIG. 1.

The decoder 12 extracts the encoded picture 21 out of a received packet. The decoder 12 decodes the encoded picture 21 to produce the decoded picture 22 by a Huffmann decoding process, a dequantization process and an inverse discrete cosine transform. The decoder 12 stores the decoded picture 22 in the memory 15.

The encoded picture 21 is given a two-value indication by an encoder if the encoder either has run the encoded picture 21 through an encoder's deblocking filter or has not. The decoder 12 gives the decoded picture 22 an indication which is a same as the indication given to the encoded picture 21, called a filter indication having a value of either yes (having passed through the encoder's deblocking filter) or no (having bypassed the encoder's deblocking filter).

The decoder 12 gives the decoded picture 22 another two-value indication if the decoded picture 22 is either referred to by another picture (referred) or not (non-referred). The above indication is hereinafter called a reference indication. According to the H.264/AVC standard, the reference indication may be determined by an element of a header of a Network Adaptation Layer (NAL) unit.

The decoder 12 gives the decoded picture 22 an indication what numerical order the encoded picture 21 is in counting from a P-picture immediately after an I-picture that has been most recently received. The above indication of the numerical order is hereinafter called an order indication and is denoted by an integer X. If the en-coded picture 21 is, e.g. a P-picture immediately after a most recently received I-picture, the order indication of the decoded picture 22 equals one. If, e.g. another P-picture is received between the most recent I-picture and the encoded picture 21, the order indication of the decoded picture 22 equals two.

The controller 11 stores the filter indication, the reference indication and the order indication together with the decoded picture 22 in the memory 15.

The controller 11 reads the decoded picture 22 out of the memory 15. If the filter indication of the decoded picture 22 is yes, the controller 11 runs the decoded picture 22 through the deblocking filter 13 to produce the decoded picture 23. If the filter indication of the decoded picture 22 is no, the controller 11 has the decoded picture 22 bypass the deblocking filter 13 to produce the decoded picture 23 that equals the decoded picture 22.

The controller 11 may, however, have the decoded picture 22 bypass the deblocking filter 13 with reference to one of the order indication and the reference indication of the decoded picture 22 even if the filter indication is yes, as described later.

An operation of the controller 11 of the first embodiment of the present invention as configured above will be described with reference to FIG. 2, a flow chart of the operation. The controller 11 starts the operation upon detecting the encoded picture 21 that has been received by the decoder 12, and the decoder 12 decodes the encoded picture 21 (step S11a). The decoder 12 looks into a type of the encoded picture 21 and notifies the controller 11 of the type, one of an I-picture and a P-picture. The controller 11 determines the type of the encoded picture 21 according to the above notification (step S11b).

A series of pictures starting from a P-picture received immediately after an I-picture and ending at a next I-picture is called a Group of Pictures (GoP). In a case where it is determined that the encoded picture 21 is an I-picture at the step S11b, a size of the GoP is set to a variable A that the controller 11 has held in advance. The variable A is then set to one (step S11c).

In a case where it is determined that the encoded picture 21 is a P-picture at the step S11b, the controller 11 adds one to the variable A (step S11d). The controller 11 thereby calculates the GoP size between two I-pictures. The controller 11 averages a plurality of GoP sizes excluding a GoP size of a singular value. A size of a first GoP after the operation is started may be singular, as there is no previous I-picture and an initial value of the variable A may be indefinite. A size of a particular GoP different from an equal size of other GoPs is treated as singular.

The above averaged GoP size is hereinafter denoted by a variable Y. In a case where an interval of two I-pictures is considered to be a constant, the controller 11 may calculate and determine a value of the variable Y after a given number of I-pictures is received instead of the steps S11b-S11d.

The controller 11 detects an amount of a load of the processor 14 (step S11e) based on a number of the decoded pictures stored in the memory 15 one of which is the decode picture 22. The controller 11 compares the detected amount of the load with a plurality of thresholds (step S11f).

In a case where the amount of the load is lower than a given value of a first threshold, the controller 11 runs any one of the decode pictures stored in the memory 15 given a filter indication of yes through the deblocking filter 13i (step S11g). The decoded picture 22, assumed to be given a filter indication of yes, thereby passes through the deblocking filter 13 and the decoded picture 23 is produced. The controller 11 then ends the operation (step S11h).

In a case where the amount of the load is no lower than the first threshold and higher than a given value of a second threshold which is higher than the first threshold (i.e. between the first and the second thresholds), the controller 11 determines if the decoded picture 22 is either a referred picture or a non-referred picture (step S11i). The controller 11 may determine the above by looking into the reference indication of the decoded picture 22, and may determine the above by having the deblocking filter 13 look into the reference indication of the decoded picture 22.

In a case where it is determined that the decoded picture 22 is a non-referred picture at the step S11i, the controller 11 has the decoded picture 22 bypass the deblocking filter 13 to produce the decoded picture 23 that equals the decoded picture 22, even if the filter indication of the decoded picture 22 is yes (step S11j). The controller 11 then ends the operation (step S11h).

In a case where it is determined that the decoded picture 22 is a referred picture at the step S11i, the controller 11 runs the decoded picture 22 through the deblocking filter 13, if the decoded picture 22 has a filter indication of yes.

In a case where the amount of the load is higher than the second threshold at the step S11f, the controller 11 determines if the decoded picture 22 has significant influence on a plurality of other pictures that refer to the decoded picture 22, either yes (i.e. having significant influence) or no (i.e. having insignificant influence) (step S11k). If the decoded picture 22 has insignificant influence on the other pictures, the decoded picture 22 may generally bypass the deblocking filter 13 with a higher probability. Generally for a higher amount of the load, it should be determined that the decoded picture 22 has insignificant influence with a higher probability. The controller 11 uses one of a first criterion and a second criterion as described below for determining a degree of influence as described above.

A process based on the first criterion is as follows. The controller 11 defines a non-decreasing function including the averaged GoP size Y as a parameter. The amount of the load is an input of the nondecreasing function. An output of the non-decreasing function is denoted by a variable N, a number of pictures having insignificant influence. The non-decreasing function is defined so that a minimum value of the output N is one and a maximum value of the output N is Y−1, which is a number of P-pictures included in the GoP. The nondecreasing function may adjust a ratio of a number of the pictures having insignificant influence to a number of all the pictures to be processed by utilizing the variable Y as a parameter.

If the decoded picture 22 is a P-picture and the order indication X of the decoded picture 22 is no less than a difference between the parameter Y and the output N of the decoded picture 22 ($X \geq Y-N$), the controller 11 determines that the decoded picture 22 has insignificant influence. The controller 11 then has the decoded picture 22 bypass the deblocking filter 13 even if the filter indication of the decoded picture 22 is yes (step S11$j$).

If the order indication X is less than the deference between the parameter Y and the output N ($X<Y-N$) at the step S11$k$, the controller 11 determines that the decoded picture 22 has significant influence. The controller 11 then determines if the decoded picture 22 is a non-referred picture (step S11$i$). The controller 11 either runs the decoded picture 22 through the deblocking filter 13 (step S11$g$) or has the decoded picture 22 bypass the deblocking filter 13 (step S11$j$) as determined at the step S11$i$.

In a case where the amount of the load is higher than the second threshold at the step S11$f$, the controller 11 has the decoded picture 22 bypass the deblocking filter 13 if the decoded picture 22 has significant influence and is non-referred. In addition, the controller 11 has the decoded picture 22 bypass the deblocking filter 13 if the decoded picture 22 is a P-picture immediately before an I-picture.

If the amount of the load is further higher, the controller 11 may have a larger number of P-pictures immediately before an I-picture bypass the deblocking filter. The controller 11 may thus reduce a load of operating the deblocking filter 13 while minimizing an accumulation of block noises of the decoded picture 23.

A process based on the second criterion is as follows. The controller 11 defines a non-increasing function including the averaged GoP size Y as a parameter. The amount of the load is an input of the non-increasing function. An output of the non-increasing function is denoted by a variable Q, a number of pictures having significant influence. The non-increasing function is defined so that a minimum value of the output Q is one and a maximum value of the output Q is Y−1.

If the order indication X of the decoded picture 22 is no greater than the output Q ($X \leq Q$), the controller 11 determines that the decoded picture 22 has significant influence. If the order indication X of the decoded picture 22 is greater than the variable Q ($X>Q$), the controller 11 determines that the decoded picture 22 has insignificant influence. Although the second criterion does not necessarily need the GoP size Y as a parameter, an output of the non-increasing function may vary depending on a value of the GoP size Y as a parameter of the non-increasing function. Other than that, the process based on the second criterion is a same as the process based on the first criterion, and its explanation is omitted.

In a case where the amount of the load is higher than a third threshold which is higher than the second threshold, the controller 11 may have the decoded picture 22 bypass the deblocking filter 13 with no exception, even if the filter indication is yes and even if the decoded picture 22 is an I-picture (not shown).

Figure 2:
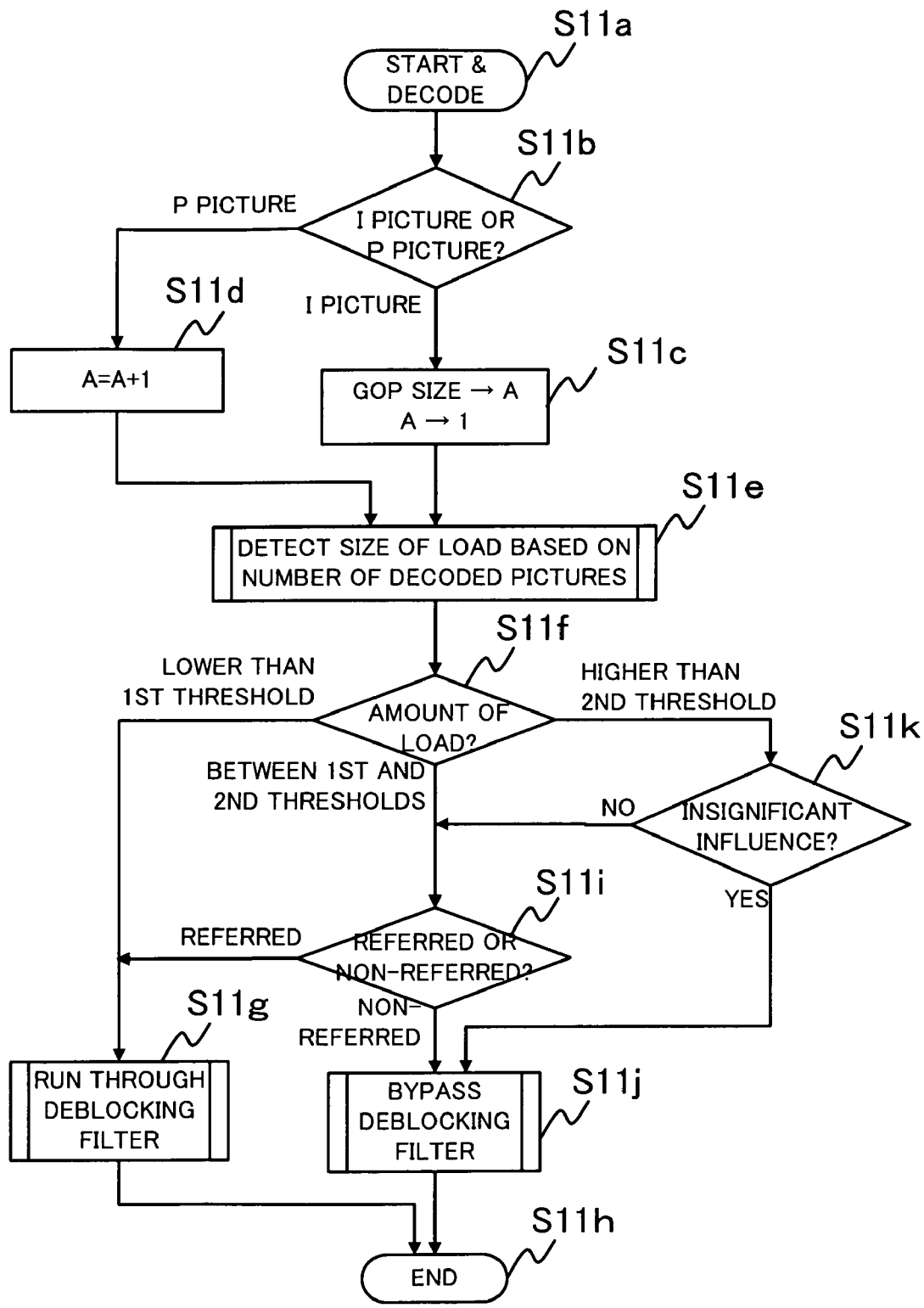
FIG. 2 is a flow chart of an operation for controlling a deblocking filter of the first embodiment of the present invention.

In FIG. 2, the step S11$i$ and the step S11$k$ may be alternated with each other. In a case where the steps S11$i$ and S11$k$ are alternated and the amount of the load is between the first and the second thresholds, the controller 11 determines if the decoded picture 22 has significant influence. The controller 11 has the decoded picture 22 bypass the deblocking filter 13 if the decoded picture 22 has insignificant influence (step S11$j$). The controller 11 runs the decoded picture 22 through the deblocking filter 13 if the decoded picture 22 has significant influence (step S11$g$).

In a case where the steps S11$i$ and S11$k$ are alternated and the amount of the load is higher than the second threshold, the controller 11 runs the decoded picture 22 through the deblocking filter 13 if the decoded picture 22 has significant influence and is a referred picture, and otherwise has the decoded picture 22 bypass the deblocking filter 13. The alternation described above causes no substantial change to the determination if the deblocking filter 13 is bypassed.

The encoded picture 21 may be given no filter indication. Even if the encoded picture 21 is given no filter indication, the deblocking filter 13 may suppress blocking noise of the decoded picture 22. Even if the encoded picture 21 is given no filter indication, the controller 11 may select a decoded picture bypassing the deblocking filter according to the amount of the load.

In the above description, it is assumed that inter-encoding is a method of encoding a plurality of differentials between a picture and another relatively past picture that has been encoded past. It may be assumed, however, that inter-encoding may be a method of encoding a plurality of differentials between a picture and another relatively either past or future picture that has been encoded past. A picture inter-encoded by the above latter method is called a B-picture. In a case where a B picture is also used, the controller 11 may determine if the decoded picture 22 has either significant or insignificant influence based on a number of encoded pictures before a next I-picture, too.

Figure 3:
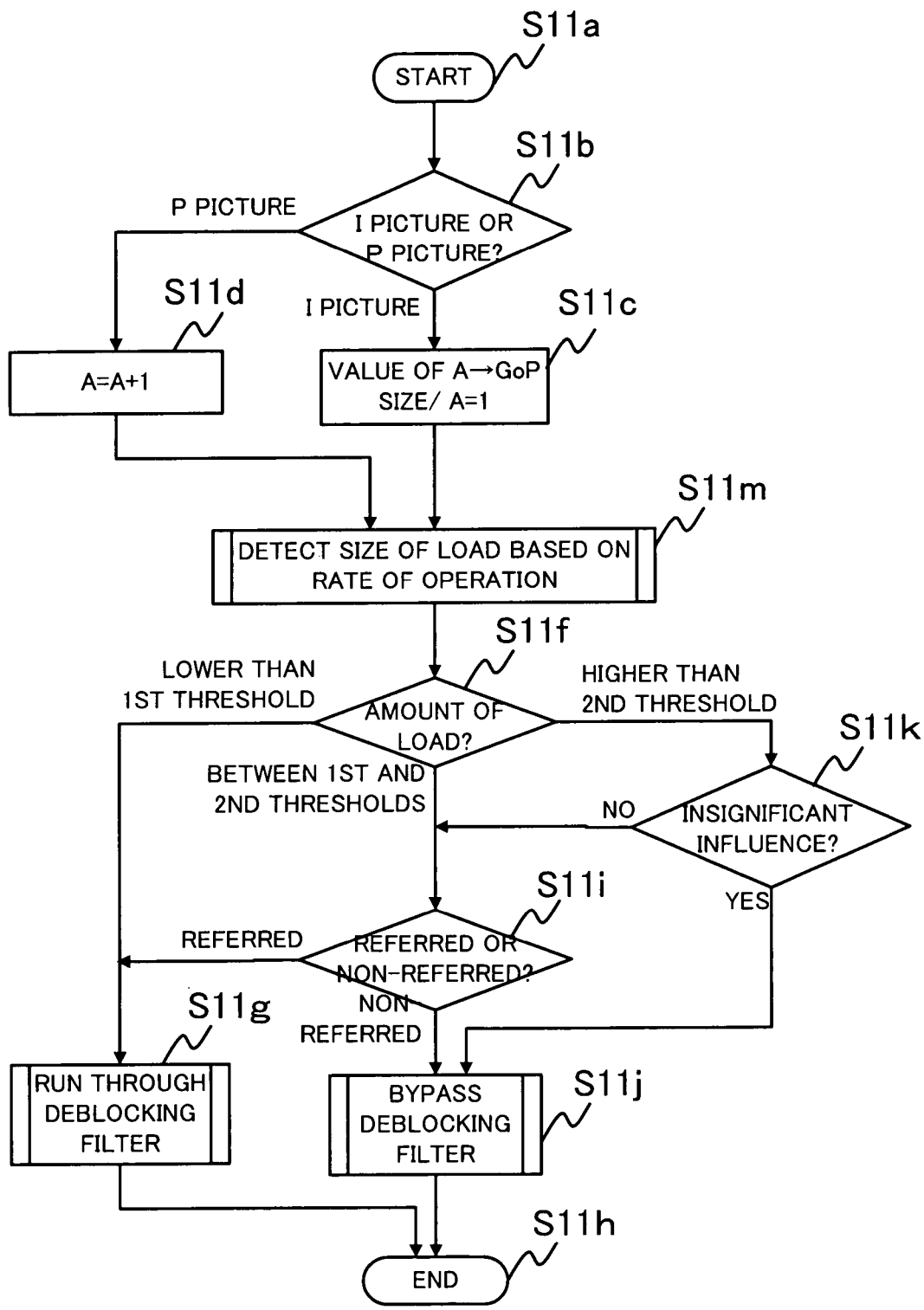
FIG. 3 is a flow chart of an operation for controlling a deblocking filter of the second embodiment of the present invention.

A second embodiment of the present invention will be described with reference to FIG. 3. A decoding apparatus of the second embodiment of the present invention is a same as the decoding apparatus of the first embodiment, and FIG. 3 is also a flow chart of an operation of the controller 11. Each step in FIG. 3 except for a step S11$m$ is a same as the corresponding one in FIG. 2 given the same reference numeral, and its explanation is omitted.

The controller 11 detects an amount of a load of the processor 14 based on a rate of operation either after setting a size of the GoP to a variable A and setting the variable A to one (step S11$c$), or after adding one to the variable A (step S11$d$). The controller 11 then compares the amount of the load with the first and the second thresholds.

The present invention may be applied to a combination of the first embodiment and the second embodiment both described above. The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A decoding apparatus, comprising:

a decoder configured to receive a series of encoded pictures and to decode each of the encoded pictures to produce a series of decoded pictures, each of the encoded pictures being one of an intra-encoded picture and an inter-encoded picture, and each of the decoded pictures being one of a referred picture and a non-referred picture;

a blocking noise suppressor configured to suppress blocking noise of each of the decoded pictures; and a controller configured to detect an amount of a load, to run each of the referred decoded pictures through the blocking noise suppressor in a case in which the detected amount of the load is no lower than a first threshold, and to have each of the non-referred decoded pictures bypass the blocking noise suppressor in a case in which the detected amount of the load is no lower than the first threshold, wherein the controller is configured to detect the amount of the load by counting a number of the decoded pictures that have not been transmitted.

2. The decoding apparatus of claim 1, wherein the controller is further configured to select more of the decoded pictures decoded from one of the inter-encoded pictures in order of being close to another one of the decoded pictures decoded from one of the intra-encoded pictures, as the detected amount of the load increases, and to have the selected decoded pictures bypass the blocking noise suppressor in a case in which the detected amount of the load is higher than a second threshold, the second threshold being higher than the first threshold.

3. The decoding apparatus of claim 1, wherein the blocking noise suppressor comprises a deblocking filter.

4. The decoding apparatus of claim 1, wherein the controller is further configured to select more of the decoded pictures decoded from the inter-encoded pictures, as the detected amount of the load increases, and to have the selected decoded pictures bypass the blocking noise suppressor in a case in which the detected amount of the load is higher than a second threshold, the second threshold being higher than the first threshold.

5. The decoding apparatus of claim 1, wherein the controller is further configured to select at least one of the decoded pictures decoded from the inter-encoded pictures based on an order indication of the decoded picture, the number of the selected decoded pictures being decided based on the amount of the load, and to have the selected at least one of the decoded pictures bypass the blocking noise suppressor in a case in which the detected amount of the load is higher than a second threshold, the second threshold being higher than the first threshold.

6. A decoding apparatus, comprising:

a decoder configured to receive a series of encoded pictures and to decode each of the encoded pictures to produce a series of decoded pictures, each of the encoded pictures being one of an intra-encoded picture and an inter-encoded picture, and each of the decoded pictures being one of a referred picture and a non-referred picture;

a blocking noise suppressor configured to suppress blocking noise of each of the decoded pictures; and a controller configured to detect an amount of a load, to run each of the decoded pictures through the blocking noise suppressor in a case in which the detected amount of the load is lower than a given threshold, to select more of the decoded pictures decoded from one of the inter-encoded pictures in order of being close to another one of the decoded pictures decoded from one of the intra-encoded pictures, as the detected amount of the load increases, and to have the selected decoded pictures bypass the blocking noise suppressor in a case in which the detected amount of the load is no lower than the threshold, wherein the controller is configured to detect the amount of the load by counting a number of the decoded pictures that have not been transmitted.

7. The decoding apparatus of claim 6, wherein the controller is further configured to have each of the non-referred decoded pictures bypass the blocking noise suppressor in a case in which the detected amount of the load is higher than a level being higher than the threshold.

8. The decoding apparatus of claim 6, wherein the blocking noise suppressor comprises a deblocking filter.

9. A method for controlling a blocking noise suppressor, comprising:

receiving a series of encoded pictures, each of the encoded pictures being one of an intra-encoded picture and an inter-encoded picture;

decoding each of the encoded pictures to produce each of a series of decoded pictures, each of the decoded pictures being one of a referred picture and a non-referred picture;

detecting an amount of a load;

running each of the referred decoded pictures through the blocking noise suppressor in a case in which the detected amount of the load is no lower than a first threshold; and having each of the non-referred decoded pictures bypass the blocking noise suppressor in a case in which the detected amount of the load is no lower than the first threshold, wherein the amount of the load is detected by counting a number of the decoded pictures that have not been transmitted.

10. The method for controlling a blocking noise suppressor of claim 9, further comprising:

selecting more of the decoded pictures decoded from one of the inter-encoded pictures in order of being close to another one of the decoded pictures decoded from one of the intra-encoded pictures, as the detected amount of the load increases; and having the selected decoded pictures bypass the blocking noise suppressor in a case in which the detected amount of the load is higher than a second threshold, the second threshold being higher than the first threshold.

11. The method for controlling a blocking noise suppressor of claim 9, wherein the blocking noise suppressor comprises a deblocking filter.

12. The method for controlling a blocking noise suppressor of claim 9, further comprising:

selecting more of the decoded pictures decoded from the inter-encoded pictures, as the detected amount of the load increases; and having the selected decoded pictures bypass the blocking noise suppressor in a case in which the detected amount of the load is higher than a second threshold, the second threshold being higher than the first threshold.

13. The method for controlling a blocking noise suppressor of claim 9, further comprising:

selecting at least one of the decoded pictures decoded from the inter-encoded pictures based on an order indication of the decoded picture, the number of the selected decoded pictures being decided based on the amount of the load; and having the selected at least one of the decoded pictures bypass the blocking noise suppressor in a case in which the detected amount of the load is higher than a second threshold, the second threshold being higher than the first threshold.

* * * * *